July 14, 1964 W. KLEIN 3,141,153

IMMEDIATE SEQUENTIAL ACCESS MEMORY

Filed Oct. 20, 1961 3 Sheets-Sheet 1

INVENTOR.
WALTER KLEIN
BY Samuel B. Stone
ATTORNEY

July 14, 1964 W. KLEIN 3,141,153

IMMEDIATE SEQUENTIAL ACCESS MEMORY

Filed Oct. 20, 1961 3 Sheets-Sheet 2

INVENTOR.
WALTER KLEIN
BY Samuel B. Stone
ATTORNEY

INVENTOR.
WALTER KLEIN
BY Samuel B. Stone
ATTORNEY

United States Patent Office 3,141,153

Patented July 14, 1964

3,141,153

IMMEDIATE SEQUENTIAL ACCESS MEMORY

Walter Klein, Santa Ana, Calif., assignor to Beckman Instruments, Inc., a corporation of California Filed Oct. 20, 1961, Ser. No. 146,506

13 Claims. (Cl. 340—173)

Figure 1:
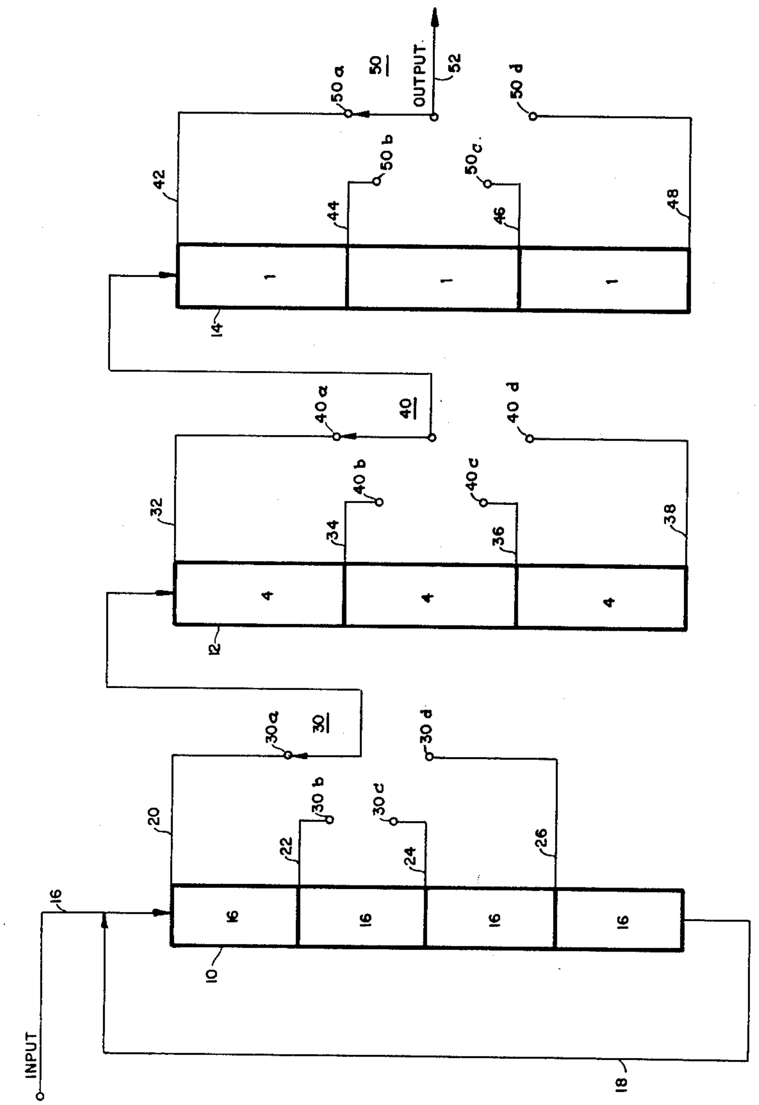

This invention relates to memory devices and more particularly to memory devices or systems having immediate sequential access and employing cyclic memory elements.

Various types of memory devices or systems are known in the prior art. Examples of such devices are core memories, magnetic drum memories, paper and magnetic tape memories, delay lines, etc. An immediate access memory device may be defined as a memory device into which data may be entered, or from which data may be withdrawn, at random times. If the memory has sequential access, each time information, which may be a bit, character, word, etc., is entered into or withdrawn from the memory device the memory address is increased or decreased by one. The information therefore is selected sequentially.

Immediate sequential access memory devices, such as sequential magnetic core memories, have been known in the past. However, relative to certain other memory elements, cores are expensive. Cyclic memory elements, such as magnetic drums, delay lines, etc., generally are less expensive than core memories, but because of the access time of cyclic memories, it heretofore has not been possible to construct from cyclic memory elements memory devices having immediate sequential access.

Accordingly, it is a principal object of the present invention to provide an immediate sequential access memory device utilizing cyclic memory elements.

An additional object of the present invention is the provision of a memory device employing cyclic memory elements and providing immediate sequential access for the unloading of series units of data of any length.

A further object of the present invention is in the provision of an immediate sequential access memory device using cyclic memory elements and which has the equivalent logical characteristics of a sequential core memory device.

According to a principal feature of the present invention, cyclic memory elements are utilized in a memory device having immediate sequential access for the unloading of data. These cyclic memory elements may be delay lines, memory drums, memory disks, portions of a track or tracks on memory drums or disks, or the like.

According to a further feature of the present invention, a memory device is provided which includes a plurality of cyclic memory elements having normally sequentially operating switching devices connected wtih the outputs of the memory elements. Each cyclic memory element has an input and a plurality of outputs whereby data applied to the input are available sequentially at the outputs. One sequential switching device is connected with the outputs of a first memory element and the input of a second memory element. A second sequential switching device, similar to the first, is connected with the outputs of the second memory element and an output terminal of the memory device, or with the next succeeding memory element where three or more memory elements are utilized. The switching devices are operated sequentially to connect successive outputs of a memory element with the input of the next memory element, or with the output terminals of the memory device, in a manner such that a particular unit of data is available continuously at the output terminal of the memory device as this unit of data advances along the memory elements. A circuit is provided to inhibit the operation of the switching devices to make available at the output terminal of the memory device succeeding units of data.

Figure 3:
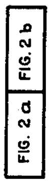
Figure 2A:
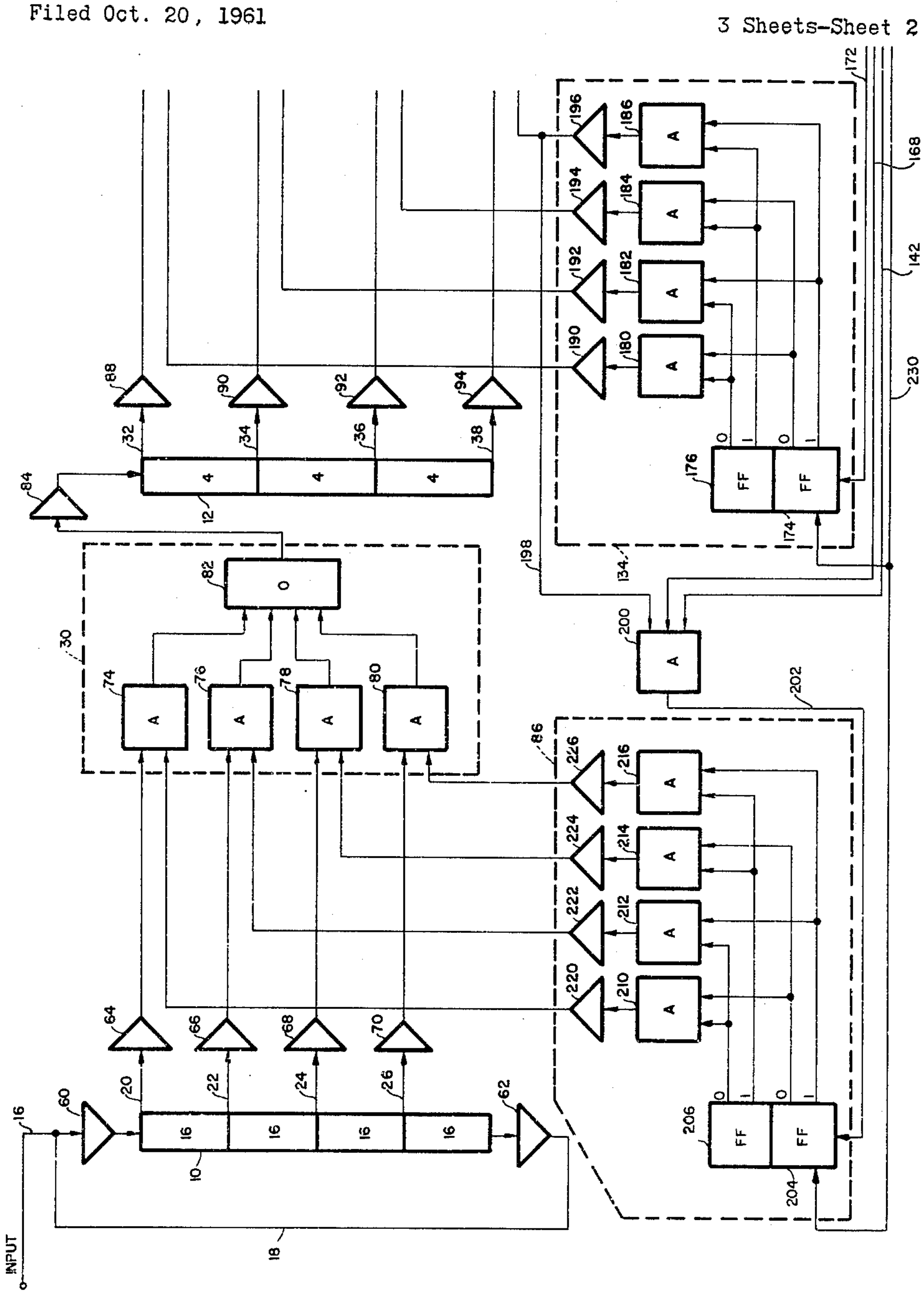
Figure 2B:
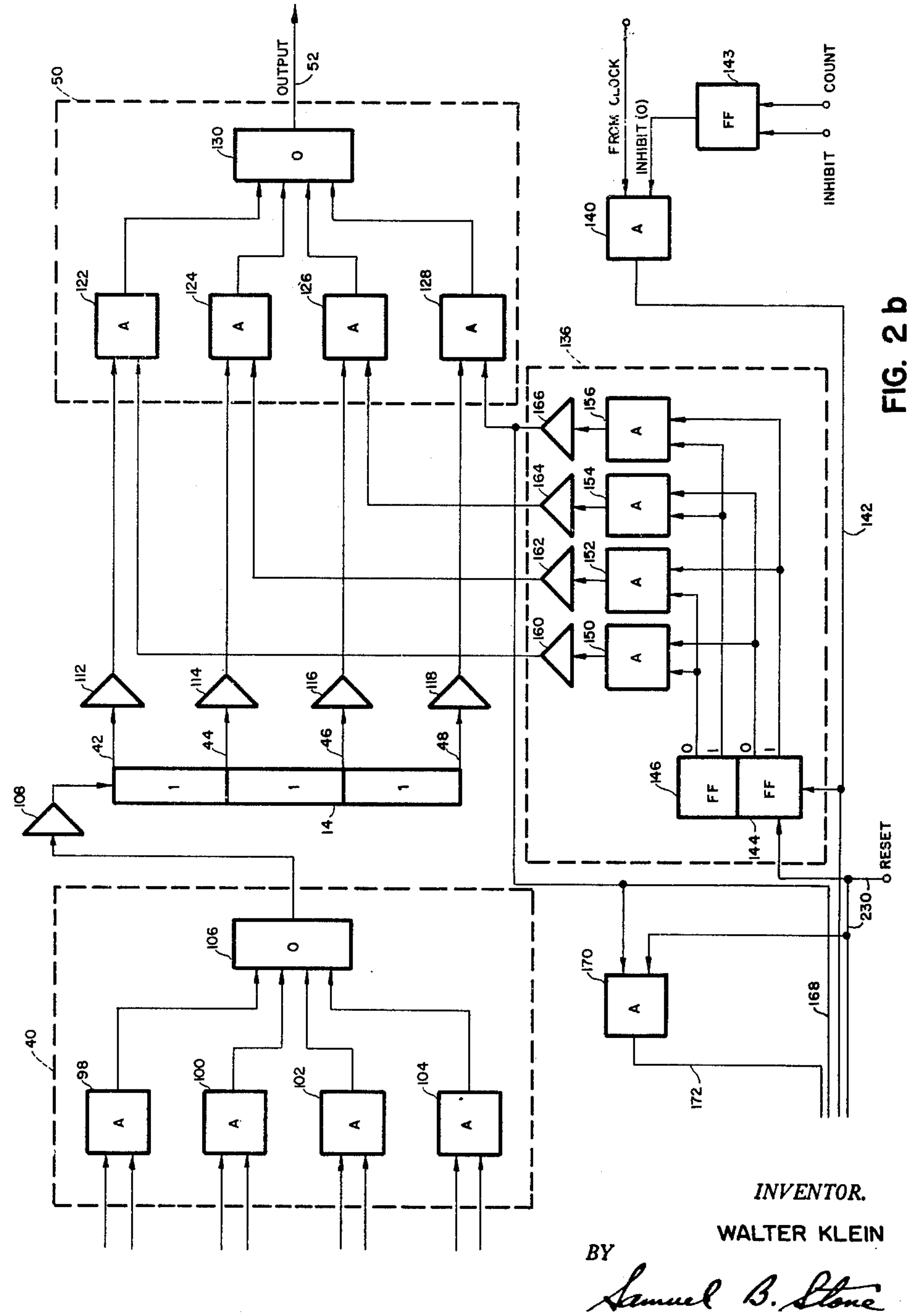

Other features and objects of the invention will be better understood from a consideration of the following detailed description when read in conjunction with the attached drawings in which:

FIG. 1 is a schematic representation of the principles embodied in the present invention; and FIGS. 2*a* and 2*b* ,when arranged as shown in FIG. 3, illustrate in block diagram form an exemplary memory device constructed in accordance with the teachings of the present invention.

In order to give an understanding of the basic principles of the present invention, the following discussion sets forth these principles using a delay line as an exemplary cyclic memory element. However, it is to be understood that the following discussion and the principles of the present invention are equally applicable to other types of cyclic memory elements.

A delay line is a typical cyclic memory element. A series of units of information is applied to the input transducer of the delay line. The information propagates through the delay line and is received at an output transducer after a delay of $\Delta t$. In order to retain the information, it is recirculated, that is, the information received by the output transducer is reapplied to the input transducer. The addressing of a unit of information is by time selection. The maximum access time is $\Delta t$, and the average access time is $\Delta t/2$. Each unit of information may be a bit, a group of bits, a character, a word, etc.

Since the maximum access time of cyclic memory element is equal to its time length, a lower access time can be achieved by decreasing this length. In an extreme case, the maximum access time for any unit of information may be made to be one unit of time if a memory element which can store $n$ characters has $n-1$ selectable taps. However, for practical purposes, this arrangement is prohibitive in cost. Where sequential address selection is sufficient, the present invention provides immediate sequential access to stored data.

Referring to FIG. 1, three cyclic memory elements 10, 12 and 14 are shown. These memory elements may be delay lines, such as, magnetostrictive delay lines, or they may be magnetic or electrostatic storage drums, disks, portions of a track or tracks of storage drums or disks, or the like. An input line 16 is connected to the input transducer of the first memory element 10. The input line 16 supplies sequential units of data to the first memory element 10. For purposes of description, these units of data will be called characters, but other units of data, such as, bits, etc., may be employed. A recirculation path is provided by a line 18 which is connected from the output transducer of the memory element 10 to the input transducer thereof. Data propagates through the memory element 10 and is reapplied to the input thereof through the line 18 when it is desired to retain this data for a period of time exceeding the delay of the memory element 10. The memory element 10 is provided with a plurality of taps 20, 22, 24, and 26. These taps are connected to output transducers along the delay line. The taps 20, 22, 24 and 26 are connected to respective terminals 30*a*, 30*b*, 30*c* and 30*d* of a switch 30. The movable contact of the switch 30 is connected to an input transducer of the memory element 12.

The memory element 12 has three taps 32, 34 and 36, and an output 38 connected to respective contacts 40*a*, 40*b*, 40*c* and 40*d* of a switch 40. The movable contact of the switch 40 is connected to an input transducer of the memory element 14. The memory element 14 has three taps 42, 44 and 46, and an output 48 connected to respective contacts 50*a*, 50*b*, 50*c* and 50*d* of a switch 50. The movable contact of the switch 50 is connected to an output line 52. The switches 30, 40 and 50 are illustrated in FIG. 1 as mechanical devices for simplicity of illustration. However, in practice it is preferable that these switches be solid state devices because of their greater speed of operation.

Assume, for example, that the capacity of the memory element 10 is sixty-four characters, the capacity of the memory element 12 is twelve characters and the capacity of the memory element 14 is three characters. Assume also that the memory element 10 is to be filled with sixty-four characters and that at the time the first character is entered into the memory element 10 the switches 30, 40 and 50 are all at their (*a*) positions. According to a feature of this invention, the switches 30, 40 and 50 are reset and then controlled so that at the end of every character time period the switch 50 is advanced one position, finally returning from the contact 50*d* to the contact 50*a*. The switch 40 is advanced one position when the switch 50 returns to the contact 50*a*, and the switch 30 is advanced one position when the switch 40 is returned to the contact 40*a*. In this manner, the first character is supplied to the output line 52 continuously. That is, as the first character progresses through the memory element 10, it is continuously available at the output line 52, and since the memory element 10 is recirculating this operation occurs indefinitely. According to another feature of this invention, the operation of the switch 50 may be inhibited once, twice, etc., to supply on the output line 52 the respective second, third, etc., unit of data. It will be obvious to those skilled in the art that the memory elements may have a smaller or a larger capacity and different numbers of taps as desired. The number of memory elements required depends upon the capacity of the memory elements and the number of taps used. Furthermore, different type memory elements may be used within a single memory device of this nature if desired.

FIGS. 2*a* and 2*b*, when arranged as shown in FIG. 3, illustrate in detailed schematic block diagram form a memory device utilizing the concepts of the present invention. Like reference numerals are employed to designate equivalent components in both FIG. 1 and FIGS. 2*a* and 2*b*. The input line 16 is connected through a write amplifier 60 to the memory element 10. A read amplifier 62 is connected in the recirculation line 18 of the memory element 10. The memory element 10 may be, for example, magnetostrictive delay line having four output taps 20, 22, 24 and 26 positioned along the line. Assuming a delay line capable of operation up to one megacycle, one microsecond per bit, 8 bits per character, and a capacity of 64 characters, the magnetostrictive memory element 10 is 512 microseconds long.

The taps 20, 22, 24 and 26 are connected through respective read amplifiers 64, 66, 68 and 70 to And circuits or gates 74, 76, 78 and 80, respectively. The And circuits 74, 76, 78 and 80 and an Or circuit 82 comprise the switch 30. The And circuits 74, 76, 78 and 80 are enabled or conditioned from a counting circuit 86 which will be described subsequently. The output of the And circuits 74, 76, 78 and 80 are connected as inputs to the Or circuit 82. The output of the Or circuit 82 is connected through a write amplifier 84 to the memory element 12. The memory element 12 also may be a magnetostrictive delay line, and may, for example, have a capacity of 12 characters and be 96 microseconds long. It is not necessary that the memory element 12 recirculate.

The taps 32, 34 and 36, and the output 38 on the memory element 12 are connected through respective read amplifiers 88, 90, 92 and 94 to And circuits or gates 98, 100, 102 and 104, respectively, in FIG. 2*b*. The switch 40 includes the And circuits 98, 100, 102 and 104 and an Or circuit 106. The outputs of the And circuits 98, 100, 102 and 104 are connected through the Or circuit 106 and a write amplifier 108 to the memory element 14. The memory element 14 also may be a magnetostrictive delay line. This delay line 14 may have a capacity of 3 characters and be 24 microseconds long, for example. It is not necessary that the memory element 14 recirculate.

The taps 42, 44 and 46, and the output 48 on the memory element 14 are connected through respective read amplifiers 112, 114, 116 and 118 to And circuits or gates 122, 124, 126, and 128, respectively. The switch 50 includes the And circuits 122, 124, 126 and 128, and an Or circuit 130. The outputs of the And circuits 122, 124, 126 and 128 are applied through the Or circuit 130 to the output line 52.

Each of the switches 30, 40 and 50 is actuated from a control counter circuit which includes a pair of counter flip-flops and a decoder to apply conditioning signals successively to the And circuits of the switch. The control counter 86 (FIG. 2*a*) for the main or first stage (that which includes the memory element 10) is controlled from a control counter 134 in the next stage. The control counter 134 is controlled from a control counter 136 in the last stage (FIG. 2*b*). The control counter 136 is controlled from a clock which has a frequency equal to the frequency of occurrence of the units of information applied to the input line 16 in FIG. 2*a*. The clock is within equipment with which the present memory device is associated. For example, the present memory device may be utilized as a buffer between data-handling equipment and a read-out device such as a tape memory. In this case, the clock would be a clock within the data-handling equipment.

The clock pulses are applied through an And circuit 140 and a line 142 in FIG. 2*b* to the control counter 136. An inhibit flip-flop 143 is connected to the And circuit 140, and supplies signals to allow or to prevent the clock signals from being applied to the control counter 136. When a clock pulse is inhibited, the next succeeding unit of information is supplied to the output line 52 as will be described hereinafter.

The control counter 136 includes a pair of counter flip-flops 144 and 146 which are interconnected to count in binary code from zero through three. The counter flip-flops 144 and 146 are not shown in detail since such devices are well known in the art. These counter flip-flops are shown generally only as a pair of flip-flops but it is to be understood that gates and other associated logic devices may be connected with the flip-flops to provide proper delays, proper timing and to prevent erroneous triggering. The flip-flops 144 and 146 are connected to And circuits 150, 152, 154 and 156 which serve to decode the outputs of the flip-flops and to supply sequential conditioning signals to the And circuits 122, 124, 126 and 128, respectively. The line 142 is connected to the flip-flop 144 to supply clock pulses thereto. The Zero output line of the flip-flop 144 is connected to the And circuits 150 and 154. The One output line of the flip-flop 144 is connected to the And circuits 152 and 156. The Zero output line of the flip-flop 146 is connected to the And circuits 150 and 152. The One output line of the flip-flop 146 is connected to the And circuits 154 and 156. Initially the Zero output lines of the flip-flops 144 and 146 are up and the And circuit 150 provides an output. When the first clock pulse is applied to the line 142, the One line of the flip-flop 144 comes up and the Zero line of the flip-flop 146 remains up. Hence, the And circuit 152 provides an output upon the occurrence of the first clock pulse. The second clock pulse brings up the Zero line of the flip-flop 144 and the One line of the flip-flop 146 thereby causing the And circuit 154 to provide an output. The third clock pulse brings up the One lines of the flip-flops 144 and 146 thereby causing the And circuit 156 to provide an output. The fourth clock pulse causes the And circuit 150 to provide an output, and this sequence continues indefinitely unless one or more clock pulses are inhibited.

The output of the And circuit 150 is connected through an amplifier 160 to the And circuit 122. In a like manner, the And circuits 152, 154 and 156 are connected through respective amplifiers 162, 164 and 166 to the And circuits 124, 126 and 128, respectively. Each clock pulse received by the control counter 136 causes this counter to condition one of the And circuits 122, 124, 126 or 128 to pass a unit of information from the memory element 14 through one of the respective taps 42, 44, 46 or 48, one of the respective amplifiers 112, 114, 116 and 118 and the Or circuit 130 to the output line 52. The conditioning of the And circuits 122, 124, 126 and 128 occurs sequentially and continuously, i.e., only the And circuit 122 is conditioned, then only the And circuit 124 is conditioned, then only the And circuit 126 is conditioned, then only the And circuit 128 is conditioned, then only the And circuit 122 is conditioned, etc., unless one or more clock pulses are inhibited by the operation of the flip-flop 143.

The output of the And circuit 156 in FIG. 2*b* is applied through the amplifier 166 and a line 168 to an And circuit 170. The line 142 also is connected to the And circuit 170. The output of the And circuit 170 is connected to the control counter 134 in FIG. 2*a* by a line 172. The control counter 134 is constructed and operated in the same manner as the control counter 136 in FIG. 2*b*. The control counter 134 includes a pair of counter flip-flops 174 and 176 connected with And circuits 180, 182, 184 and 186. The line 172 is connected to the flip-flop 174, and the flip-flops 174 and 176 are constructed and operated to count in binary code from zero through three in the same manner as the flip-flops 144 and 146 in FIG. 2*b*. The And circuits 180, 182, 184 and 186 are connected through respective amplifiers 190, 192, 194 and 196 to the And circuits 98, 100, 102 and 104, respectively, in FIG. 2*b*. The counter 134 counts at one-fourth of the frequency of the counter 136, i.e., each time the counter 136 provides four successive outputs, the counter 134 provides only one particular output. The output of the And circuit 186 is connected through the amplifier 196 and a line 198 to an And circuit 200. The lines 142 and 168 also are connected to the And circuit 200. The output of the And circuit 200 is connected through a line 202 to the control counter 86.

The control counter 86 is constructed and operated in the same manner as the control counters 134 and 136, and operates at one-fourth of the frequency of the control counter 134. The relative frequencies of the counters 86, 134 and 136 depend on the number of taps employed on the memory elements. This control counter 86 includes a pair of flip-flops 204 and 206. These flip-flops are connected to And circuits 210, 212, 214 and 216. The outputs of the And circuits 210, 212, 214 and 216 are connected through respective amplifiers 220, 222, 224 and 226 to the And circuits 74, 76, 78 and 80, respectively. A reset line 230 is connected to reset to zero each of the counter flip-flops 144, 146, 174, 176, 204 and 206. In the operation of the memory device, the reset line 230 is pulsed at the beginning of entry of data through the input line 16 to the memory element 10 in FIG. 2*a*. This reset line 230 is controlled from the associated data-handling equipment which supplies the input data. When the counters 86, 134 and 136 are reset in this manner, the respective And circuits 74, 98 and 122 are conditioned to pass information from the uppermost tap of the respective memory elements 10, 12 and 14. All flip-flops may be clocked by a master clock and have built in delays to avoid erroneous triggering. The control counters are constructed and operated so that the output of the control counter caused by a particular clock or count-signal does not overlap that particular clock signal.

As noted previously, the memory elements 10, 12 and 14 may be magnetostrictive delay lines. A suitable delay line for each of these elements is a Model 5912 magnetostrictive delay line, plus output taps, supplied by Ferranti Electric Inc. Electronics Division, 95 Madison Avenue, Hempstead, L.I., N.Y. Utilizing a one megacycle line, one microsecond per bit and eight bits per character, the line 10 is 512 microseconds long, the line 12 is 96 microseconds long and the line 14 is 24 microseconds long. The taps 20, 22, 24 and 26 on the line 10 are spaced 128 microseconds apart. The taps 32, 34, 36 and 38 on the line 12 are spaced 32 microseconds apart, and the taps 42, 44, 46 and 48 on the line 14 are spaced 8 microseconds apart. In the event that it is not desired to recirculate the data in the line 10, i.e., retain this data for longer than the delay period of the line, this line could be shortened. That is, the line 10 would not have to extend past the lower tap 26. Lines of different lengths and a different number of taps other than as shown in FIGS. 2*a* and 2*b* may be employed in a memory device constructed in accordance with the teachings of the present invention. A different number of memory elements may be used, since the number of these elements depends upon the maximum capacity required and the number of taps employed.

According to a feature of the invention, the counters 86, 134 and 136 initially are reset as the first unit of information is applied through the input line 16 and the amplifier 60 to the memory element 10. Hence, the And circuits 74, 98 and 122 are conditioned. The first unit of data is applied through the tap 20 of the memory element 10, the amplifier 64, the And circuit 74, the Or circuit 82, the amplifier 84, the tap 32 of the memory element 12, the amplifier 88, the And circuit 98 (FIG. 2*b*), the Or circuit 106, the amplifier 108, the tap 42 of the memory element 14, the amplifier 112, the And circuit 122 and the Or circuit 130 to the output line 52. As the second unit of data is applied to the memory element 10, a clock pulse is applied through the And circuit 140 (FIG. 2*b*) and the line 142 to the control counter 136. The control counter 136 then deconditions the And circuit 122 and conditions the And circuit 124. At this time the first unit of data has progressed through a portion of each of the memory elements 10, 12 and 14 and is available at the tap 44 of the memory element 14. The second unit of data now is available at the tap 42 of the memory element 14. The first unit of data is applied through the tap 44, the amplifier 114, the And circuit 124 and the Or circuit 130 to the output line 52. As the third unit of data is applied to the memory element 10, a clock pulse causes the counter 136 in FIG. 2*b* to decondition the And circuit 124 and to condition the And circuit 126. The first unit of data now is applied through the tap 46, the amplifier 116, the And circuit 126 and the Or circuit 130 to the output terminal 52. The operation of the memory device continues in a like manner.

As the fourth unit of data is applied to the memory element 10, a clock pulse causes the counter 136 again to condition the And circuit 122. However, before the flip-flops 144 and 146 change state and decondition the And circuit 128 and condition the And circuit 122, the And circuit 170 receives the clock pulse on the line 142 and applies a signal to the control counter 134 in FIG. 2*a*. The control counter 134 then causes the And circuit 100 in FIG. 2*b* to be conditioned as the And circuit 122 in FIG. 2*b* is conditioned. The first unit of data now is applied from the tap 34 of the memory element 12, through the amplifier 90, the And circuit 100, the Or circuit 106, the amplifier 108, the tap 42 of the memory element 14, the amplifier 112, the And circuit 122 and the Or circuit 130 to the output line 52. As the eighth unit of data is entered into the memory element 10, the And circuit 102 in FIG. 2*b* is conditioned to pass the first unit of data. This sequence of operation continues and as the sixteenth unit of information is entered into the memory element 10, the And circuit 200 applies a signal to the control counter 86 which conditions the And circuit 76, the And circuit 170 applies a signal to the control counter 134 which conditions the And circuit 98 and the control counter 136 conditions the And circuit 122. When the memory element 10 becomes full, the train of data is amplified and reapplied to the input thereof. In this manner the first unit of information is available continuously and indefinitely at the output terminal 52. It should be noted that the And circuits 170 and 200 function to apply a clock or count signal to a higher order control counter only when all flip-flops of all lower order control counters provide One outputs (the One outputs are up).

According to another feature of the present invention the operation of the switches may be inhibited to provide successive units of data to the output line 52. When a count signal is applied to the flip-flop 143 in FIG. 2*b*, this flip-flop provides a conditioning input to the And circuit 140 so that each clock pulse is passed to the control counter 136. When an inhibit signal is applied to the flip-flop 143, this flip-flop deconditions the And circuit 140 so that the clock pulses are not passed to the control counter 136 and the And circuits 170 and 200. In this manner, the operation of the control counter 136 is inhibited (and the control counters 134 and 86) for one or more character times (one or more unit of information times). Hence, one of the And circuits 122, 124, 126 or 128 remains conditioned for two or more character times. For example, assume that the first character or unit of information is available at the tap 46 of the memory element 14 and that the And circuit 126 is conditioned. Also assume that the control counter 136 is inhibited for one character time. As the next unit of information is entered into the memory device, the first character becomes available at the output 48 and the second character becomes available at the tap 46. Since the And circuit 126 remains conditioned, the second character is applied through the tap 46, the amplifier 116, the And circuit 126 and the Or circuit 130 to the output line 52. If the control counter 136 is inhibited for two character times (two clock pulses), the third character becomes available on the output line 52. In a like manner, each successive character may be read out of the memory device on the output line 52.

As noted previously, cyclic memory elements other than magnetostrictive delay lines may be utilized for the memory elements 10, 12 and 14. If a drum memory were used, for example, the taps would take the form of transducers spaced about the periphery of the drum. Each memory element may be a segment of a track of a drum or disk, or an entire track. Such an arrangement would be useful in transferring data between other devices, or from other tracks of the same drum (or disk) to another device. For example, one or more tracks of a drum may be utilized as taught by the present invention to transfer data from other tracks on that drum to another drum or other data handling or storage device. If desired, different type cyclic memory elements may be used for each of the memory elements 10, 12 and 14. Also, other types of switches and control counters may be employed.

It now should be apparent that the features and objects of the present invention are achieved by interconnecting a plurality of cyclic memory elements through normally sequentially operating switches to provide a memory device having immediate sequential access to data stored therein. Although an exemplary embodiment of the invention has been disclosed and discussed, it will be understood that other applications and circuit arrangements are possible and that the embodiments disclosed may be subjected to various changes, modifications and substitutions without necessarily departing from the spirit of the invention.

What is claimed is:

1. A memory device comprising at least first and second cyclic memory elements, first means applying sequential data to said first cyclic memory element, second means connected between said first and second cyclic memory elements for receiving data from a portion of said first cyclic memory element and applying data to the input of said second cyclic memory element, third means connected with said second means for normally sequentially operating said second means to apply to said second cyclic memory element the first of said data applied to said first cyclic memory element, and fourth means for inhibiting the operation of said third means.

2. A memory device as in claim 1 wherein each of said first and second cyclic memory elements has an input and a plurality of outputs, said second means includes a switching device normally connecting the outputs of said first cyclic memory element in timed sequence to the input of said second cyclic memory element, and said fourth means may inhibit the operation of said third means to delay the operation of said switching device.

3. A memory device comprising a plurality of memory elements each having an input and a plurality of outputs whereby data applied to the input of the memory element is available sequentially at the outputs thereof, first means applying data to the input of a first of said memory elements, second means connected with said memory elements for connecting the outputs of at least said first memory element in a first timed sequence to the input of a second of said memory elements and the outputs of said second memory element in a second timed sequence to a terminal, said first timed sequence being a submultiple of said second timed seqeunce whereby the first of said data normally is applied continuously to said terminal, and third means connected with said second means to affect said timed sequences whereby successive data is applied to said output terminal.

4. A memory device as in claim 3 including fourth means controlled by said first means to reset said second means upon the application of data to said memory device.

5. A memory device as in claim 3 wherein each of said memory elements is a delay line.

6. A memory device as in claim 3 wherein each of said memory elements comprises at least a segment of a track on a cyclic storage device.

7. In a memory device, a first memory element having an input and a plurality of outputs, a second memory element having an input and a plurality of outputs, input means for applying information to the input of the first memory element, first switch means for sequentially applying the outputs of the first memory element to the input of the second memory element, an output terminal, second switch means for sequentially applying the outputs of the second memory element to the output terminal, first counter means for controlling the sequential operation of said first switch means, second counter means for controlling the sequential operation of said second switch means, control means connected with said second counter means for controlling the frequency of operation of the second counter means, means connecting the second means to said first counter means to cause said first counter means to operate at a frequency which is a submultiple of the frequency of operation of said second counter means, and means for affecting the operation of said control means to inhibit the operation of said second counter means.

8. A memory device comprising first, second and third cyclic memory elements each having an input and a plurality of outputs, first switch means for connecting sequentially each of the outputs of said first cyclic memory element with the input of said second cyclic memory element, second switch means for connecting sequentially each of the outputs of said second cyclic memory element with the input of said third cyclic memory element, third switch means for connecting sequentially each of the outputs of said third cyclic memory element with an output terminal, first, second and third control counters, control means connected with said third counter, means connecting said third counter to said third switch means to control the sequence and frequency of operation thereof, means connecting said third control counter to control the operation of said second control counter, means connecting the second control counter with said second switch to control the sequence and frequency of operation thereof, means connecting the second control counter with the first control counter, means connecting the first control counter to the first switch means to control the sequence and frequency of operation thereof, means to reset said first, second and third control counters, and means to inhibit the operation of said control means.

9. The memory device as in claim 8 wherein said second control counter counts at a frequency which is a submultiple of the counting frequency of said third control counter, and said first control counter counts at a frequency which is a submultiple of the counting frequency of said second control counter.

10. A memory device comprising at least first and second cyclic memory elements each having an input and a plurality of selectable outputs, first switch means connected with the outputs of said first cyclic memory element for connecting sequentially each of the outputs thereof with the input of said second cyclic memory element, second switch means coupled with the outputs of said second cyclic memory element for connecting sequentially each of the outputs thereof with a terminal, first and second control counters, means to apply clock signals to said second counter, means connecting said second counter to said second switch means to control the sequence and frequency of operation thereof, means connecting said second control counter to control the operation of said first control counter, means connecting the first control counter with said second switch to control the sequence and frequency of operation thereof, and means to inhibit the clock signals applied to said control means.

11. A memory device as in claim 10 including means to apply sequential units of data to the input of said first cyclic memory element whereby the first unit of said data normally is available continuously at said terminal, and as said means to inhibit the clock signals is successively operated succeeding units of data are applied to said terminal.

12. A memory device comprising at least first and second cyclic memory elements each of which has an input and a plurality of outputs, first means applying sequential units of data to the input of said first cyclic memory element, second means connected with the outputs of the said first cyclic memory element and the input of said second cyclic memory element for receiving a unit of data from one of the outputs of said first cyclic memory element and applying this unit of data to the input of said second cyclic memory element, third means connected with said second means for operating said second means normally to apply to the input of said second cyclic memory element the first unit of said data applied to said first cyclic memory element, and fourth means for controlling the operation of said third means to affect the operation of said second means whereby said second means sequentially applies one or more succeeding units of data to said second cyclic memory element.

13. A memory device as in claim 12 wherein said fourth means includes reset means responsive to said first means to reset said third means when the first unit of data is applied to the input of said first cyclic memory element.

References Cited in the file of this patent

UNITED STATES PATENTS

| | | |
|---|---|---|
| 2,601,154 | Krueger | June 17, 1954 |
| 2,966,641 | McCoy | Dec. 27, 1960 |